Oct. 25, 1955     F. W. HARRIS     2,721,888
PROCESS FOR REMOVING UNDESIRED TARS FROM A CRACKED GAS
Filed June 2, 1952     2 Sheets-Sheet 1
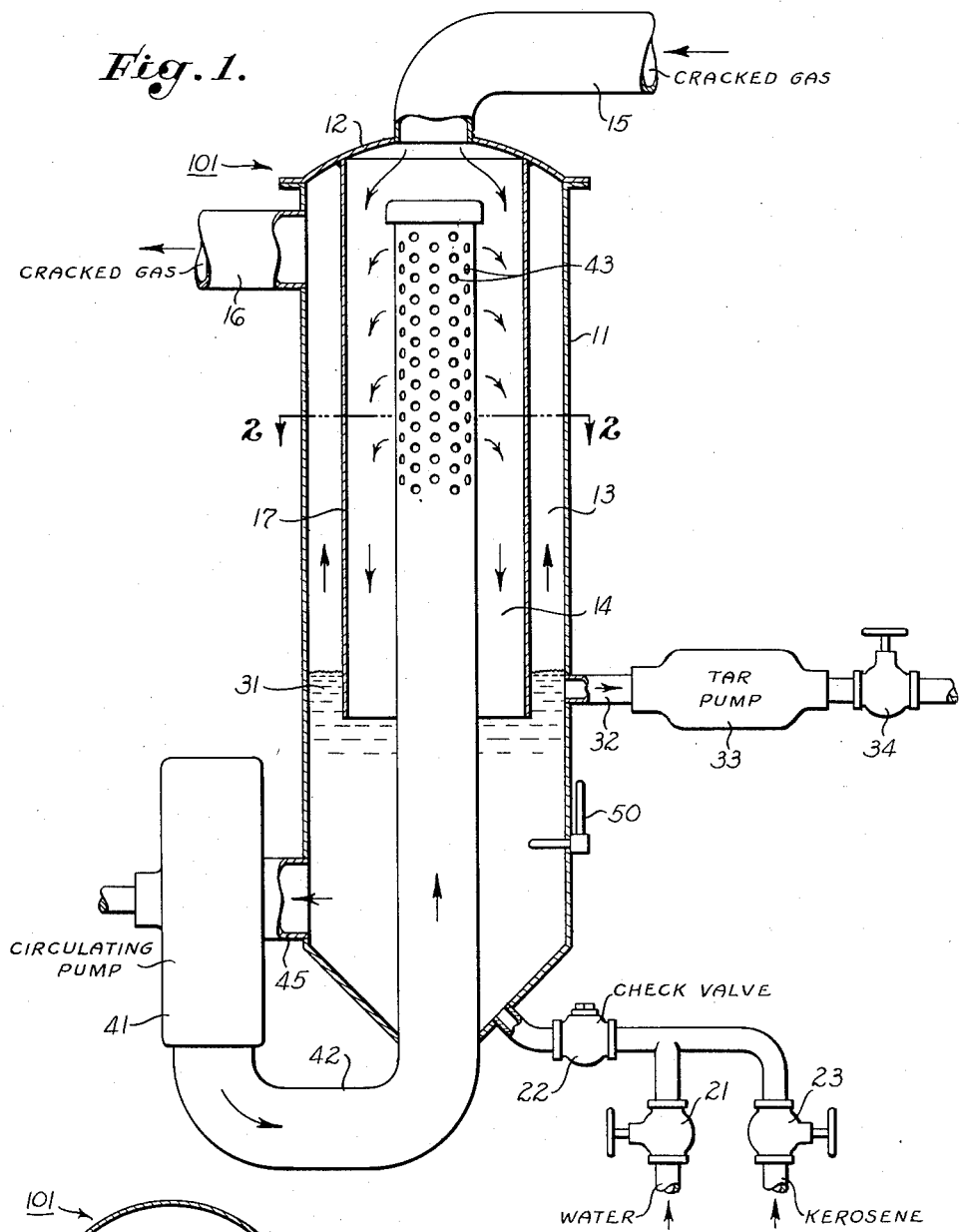
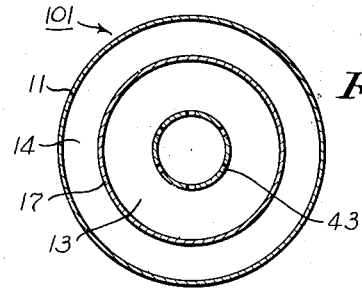
INVENTOR.
FORD W. HARRIS
BY HIS ATTORNEYS.
HARRIS, KIECH, FOSTER & HARRIS

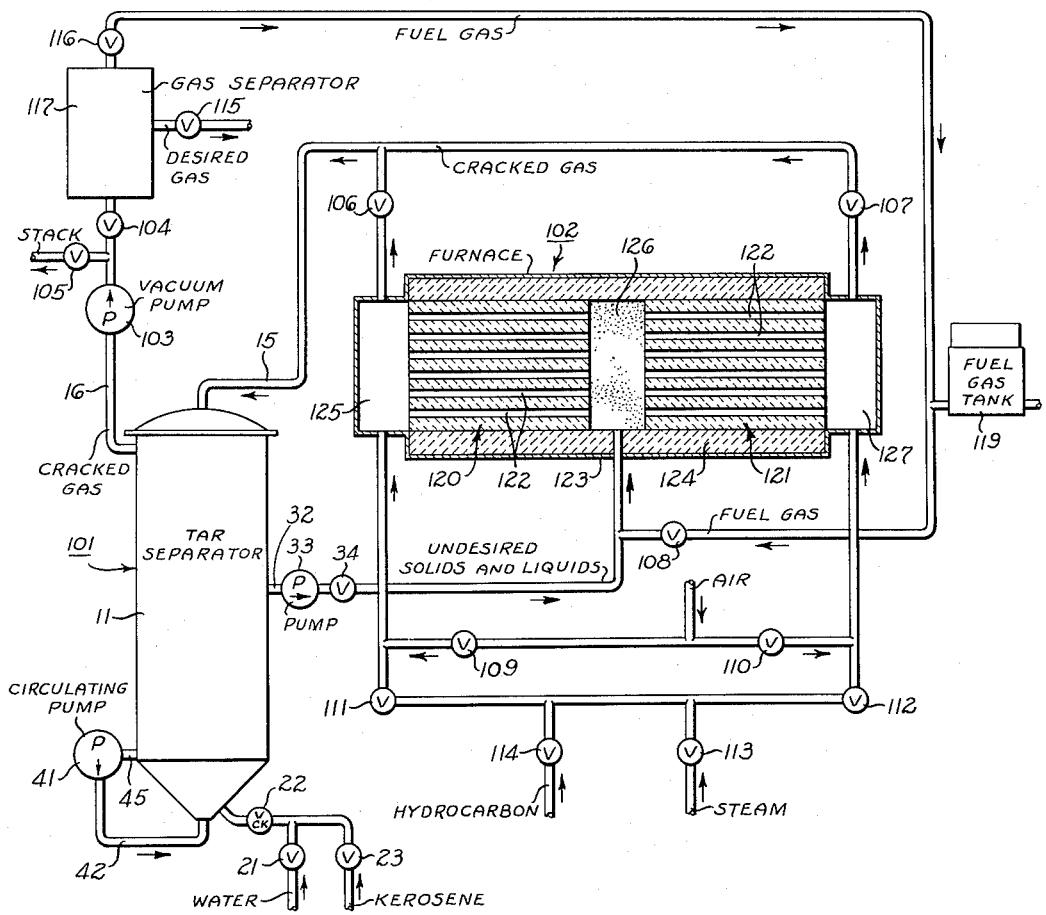
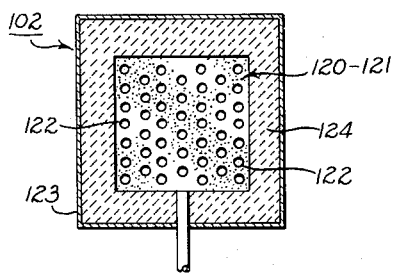

United States Patent Office 2,721,888
Patented Oct. 25, 1955

2,721,888

PROCESS FOR REMOVING UNDESIRED TARS FROM A CRACKED GAS

Ford W. Harris, Los Angeles, Calif., assignor to Wulff Process Company, Huntington Park, Calif., a corporation of California Application June 2, 1952, Serial No. 291,086

5 Claims. (Cl. 260—679)

The invention relates to processes in, and apparatus by, which acetylene and other desired hydrocarbons can be produced by the pyrolysis of suitable hydrocarbons.

The term "desired hydrocarbons" is defined as limited to hydrocarbons that are gaseous at atmospheric temperatures and pressures.

The word "pyrolysis" is defined to include all, and be limited to only, those processes in which a suitable hydrocarbon is subjected to sufficient heat to cause a molecular change in the hydrocarbon and in which free hydrogen is released from the suitable hydrocarbon.

The expression "suitable hydrocarbon" is defined as including all hydrocarbons known in the art, at the time the application for this patent was filed, as capable of forming the desired hydrocarbons, as above defined, by pyrolysis, as above defined. Methane, ethane, propane, and butane, and mixed gases which contain methane, ethane, propane, and butane are among the suitable hydrocarbons, but I have no intention of limiting my claims to any particular hydrocarbon or group of hydrocarbons.

In the pyrolysis of suitable hydrocarbons, a "cracked gas" is produced which contains one or more of the desired hydrocarbons and free hydrogen. The cracked gas will probably also contain as much as five per cent (5%) by weight of tars.

The word "tars," as used herein, includes all, and is limited to, tarry hydrocarbons which are liquids of very high viscosity at atmospheric temperature, or solids, or semi-solids. Such tars may, however, contain some free carbon.

It is an object of the invention to provide a process by, and an apparatus in, which (a) undesired tars may be removed from a cracked gas, (b) solving the disposal problem raised by the constant production of a sticky low value product, (c) the heat units otherwise wasted in the tars may be utilized to advantage in the process, and (d) at least a portion of said tars may be utilized to form the desired hydrocarbons by pyrolysis.

Further objects and advantages will be made evident hereinafter.

In the drawings:

Fig. 1 is a view partly in section of the tar separator used in the practice of the invention;

Fig. 2 is a section through the tar separator shown in Fig. 1 on a plane represented by the line 2—2 of Fig. 1, viewed in the direction of the arrows adjacent to the numerals 2—2;

Fig. 3 is a diagram of the assembly of apparatus used in the practice of the invention; and Fig. 4 is a section through the furnace.

The tar separator shown in Figs. 1 and 2 has certain general uses and advantages but is particularly useful when used in the process illustrated diagrammatically in Figs. 3 and 4.

Since the tar separator is a new and useful invention, independent of any particular use, it will be first described. The tar separator 101 consists of a cylindrical, gas-tight tank 11 having a cover 12. A skirt 17 is secured at its upper end in gas-tight relationship to the cover 12, dividing the upper portion of the tank 11 into an outer space 13 and an inner or cooling space 14. Cracked gas, that is, gas produced by the pyrolysis of a suitable hydrocarbon, said gas containing a desired hydrocarbon, free hydrogen, and undesired tar, may be admitted through an inlet pipe 15 into the top of the inner cooling space 14 and flows downwardly through that space and upwardly through the space 13 and out of the tank 11 through an outlet pipe 16.

Water is admitted to the tank 11 through a water regulating valve 21 and a check valve 22 and a solvent, preferably kerosene, is admitted to the tank 11 through a solvent regulating valve 23 and the check valve 22. The tank 11 is normally filled with liquid 31 up to the level of a pipe 32 through which liquid may be withdrawn by a withdrawal pump 33, driven by a motor (not shown), and taken from the tank 11 through an off-liquid regulating valve 34. The skirt 17 may extend down into the liquid 31.

A circulating pump 41 driven by a motor, not shown, takes the liquid 31 from near the bottom of the tank 11 and forces the liquid upwardly through a pipe 42 to a point near the cover 12 and inside the skirt 17. The upper end of the pipe 42 is provided with a multiplicity of small holes 43 through which a multiplicity of fine jets of liquid pass into the inner space 14 and through which the gas entering through the inlet pipe 15 must pass in its downward flow through the space 14, the liquid in the jets together with the tars from the gas which are dissolved or suspended in the jets being caught and retained in the main body of liquid 31 below the lower end of the skirt 17. A thermometer 50 is provided in this liquid so that the operator may know the temperature of the liquid 31 at all times.

Since the tar separator is capable of many uses, its method of operation will now be described. This method of operation is as follows: All valves being closed, gas is circulated through the pipe 15 into the inner space 14 and down around the lower end of the skirt 17, upwardly through the outer space 13, and outwardly through the pipe 16. A pump, not shown, pulls a vacuum through the pipe 16 on the interior of the tank 11. The valve 23 is opened and solvent, preferably kerosene or other petroleum distillate, is admitted to the tank 11 through the check valve 22, this check valve being so set that no fluid can escape from the tank 11 through the valve 22. The valve 23 may be closed when the tank is filled with solvent above the level of the pipe 32. The pump 41 is then started, liquid 31 is delivered, in the form of a multiplicity of small jets from the holes 43, to the top of the inner cooling space 14 where the solvent is brought into intimate contact with the gas from the pipe 15 flowing downwardly through the inner space 14. This gas may be at a temperature as high as 500° F. and an absolute pressure as low as 100 mm. of mercury. The liquid 31, carrying entrained tars, moves downwardly into the mass of liquid below the lower end of the skirt 17 and this liquid is kept hot by the hot gas. As soon as this liquid 31 reaches a little above 212° F., the valve 21 is opened and a small stream of water is jetted into the liquid 31 in the tank 11 through the check valve 22.

The liquid 31 should, at all times, be kept hot enough to vaporize the water which escapes from the tank 11 with the gas in the pipe 16. It should not be allowed to get much hotter than this vaporizing point of water as it is desired to condense and retain in the liquid all tars which are condensible at this temperature. An automatic control of the valve may be provided which reduces the flow of water as the liquid 31 falls below this vaporizing point and increases this flow as the liquid 31 rises above this vaporizing point.

The apparatus should be started with kerosene filling the tank 11, the pump 41, and the pipe 42 as the tars may have the property of solidifying, if cold, and thus freezing the apparatus. As the operation is continued, the liquid 31 starts to collect tar and becomes more viscous. If the liquid 31 is kept at a temperature above the vaporizing point of water, it is not excessively viscous and it may be pumped after all the kerosene initially in the tank 11 has been pumped out of the tank through the valve 34. It is usually expedient, however, after the liquid 31 has increased in viscosity, to open the valve 23 and continue to maintain a small proportion of kerosene in the liquid 31 as it leaves the valve 34. This is particularly true if it is desired to handle the cold tar, after it leaves the valve 34, as a moderately free-flowing liquid. The volume of liquid 31 in the tank 11 obviously increases as the operation proceeds and the operator controls the level of the liquid 31 in the tank 11 by starting the pump 33 and opening the valve 34. An automatic float control, not shown, actuated by the level of the liquid 31 in the tank 11, regulates the speed of the pump 33 to maintain this level a little above the level of the pipe 32. When the apparatus is in full operation, the operator may regulate the temperature of the liquid 31 by the water control valve, and the concentration of impurities in the liquid, delivered from the tank 11 through the valve 34, by control of solvent supply through the valve 23.

In the foregoing it has been assumed that kerosene has been admitted through the valve 23 and used as a solvent. Other solvents may be used, provided the tars are readily soluble therein, and the solvent has a sufficiently high boiling point not to vaporize in the tank but to go off with the tar through the valve 34. A few hours before the tar separator is shut down and allowed to cool, the valve 23 should be opened and the entire system flushed with kerosene so that there is no accumulation of viscous tarry material anywhere in the system.

The pump 41 keeps the liquid 31 in a state of agitation that prevents the settling and collection of impurities in any part of the tar separator. The solvent may be recovered by redistillation from the liquid delivered through the valve 34 but it is preferably consumed in the process, which will now be explained.

The tar separator is quite useful when used in the assembly of apparatus shown in Fig. 3 in which 101 is the tar separator, 102 is a furnace, and 103 is a vacuum pump. The furnace consists of a gas-tight shell 123 containing two regenerative masses 120 and 121 having channels 122 passing therethrough, as shown in Fig. 4. Heat insulation material 124 lines the furnace around the masses 120 and 121. The masses 120 and 121 divide the interior of the furnace into a left-hand end space 125, a central space 126, and a right-hand end space 127. The furnace is novel but is not claimed herein. The vacuum pump 103 is a standard pump capable of pulling a vacuum as low as 100 mm. absolute of mercury.

Valves 104, 105, 106, 107, 108, 109, 110, 111, 112, 113, 114, 115, and 116 are provided at locations which will be understood from the following description of the method of operation of the assembled apparatus. A gas separator 117 and a gas tank 119 for storage of fuel gas are also provided. The gas separator 117 is a standard assembly of various pieces of standard apparatus capable of separating the desired hydrocarbons from the cracked gas after it leaves the tar separator 101.

Before cyclic operation can start, the furnace 102 must be preheated in a preliminary operation step which is conducted as follows: All other valves being closed, valves 105, 107, and 108 are opened so that fuel gas through valve 108 is delivered to the central space 126 of the furnace. Simultaneously, valve 109 is opened delivering air through the channels in the mass 120 to the central space 126 of the furnace. The fuel gas delivered through the valve 108 is burned in the air delivered from left to right through the channels in the mass 120 and the products of combustion pass from left to right through the channels in the mass 121, heating this mass. The products of combustion pass into the right-hand end space 127 and through the valve 107 and the pipe 15 into the tar separator 101. From the tar separator, the products of combustion pass through the pipe 16, the pump 103, and the valve 105 to the stack, not shown.

If the combustion is complete in any heating step there will be no tar or free carbon to be collected in the tar separator. Each of the preheating steps and each of the heating steps described hereinafter must be discontinued before the masses 120 or 121 become heated to a temperature at which the material of the mass deteriorates rapidly is reached. With present refractory material, this destructive temperature is somewhat in excess of 3000° F. During the first preheating step, above described, before the mass 121 reaches this temperature, the valves 107 and 109 are closed and the second preheating step is started by opening the valves 106 and 110, the valves 105 and 108 remaining open. The fuel gas is still being delivered to the central space 126 through the valve 108 but the air is delivered through the valve 110 to the end space 127 and thence from right to left through the mass 121 to the central space 126 where fuel gas delivered through the valve 108 burns. The products of combustion pass from right to left through the mass 120 and through the valve 106 and the pipe 15 to the separator. In any heat step, products of combustion pass through the valve 105 to a stack, not shown. This second right to left heat step cools the mass 121 due to the passage of cold air therethrough. The mass 120 is at maximum permissible temperature and the mass 121 is considerably cooler at the end of the second preheating step. Both masses are hottest at their inner ends next to the space 126 and coolest at their outer ends next to the end spaces 125 and 127 and may, at all times, be at a temperature below 300° F. at the ends. At the termination of the second preheating step, all open valves may be closed and the furnace is now ready to go into cyclic operation.

The furnace operates, after it has been preheated as above described, on a four-step cycle consisting of a first make step, a first heat step, a second make step and a second heat step, as will now be described. During the first make step, valves 104, 106, 112, 114, 115, and 116 are open and all other valves are closed. As in-gas is formed of a suitable hydrocarbon delivered through the valve 114 and steam is delivered through the valve 113. There may be four volumes of steam in the in-gas for each volume of hydrocarbon. The in-gas passes through the valve 112 to the end space 127 of the furnace, through the masses 121 and 120, and the resulting cracked gas passes through the separator 101 where tar is extracted from it, the cleaned cracked gas passing through the pump 103 and the valve 104 to the gas separator 117. The desired hydrocarbons are delivered from the separator 117 through the valve 115 and fuel gas stripped of its acetylene is delivered through the valve 116 to the fuel gas tank 119.

During each heat step, cracked gas containing a substantial proportion of acetylene is formed in the furnace 102 and as the heat step progresses, the proportion of acetylene falls slightly. The heat step may be discontinued as soon as this proportion falls about ten per cent (10%). In practice, excellent results will be obtained if each step of the four-step cycle continues for about one minute, but these periods may vary in different furnaces and the most satisfactory may be determined by trial.

The first heat step follows exactly the procedure above described as the second preheating step, the gases flowing from right to left through the mass 121 and then the mass 120.

The second make step is like the first make step above except that the in-gas flows from left to right through the mass 120 and the mass 121.

The second heat step is like the first heat step except that the gases flow from left to right.

Until the process starts making its own fuel gas, fuel gas may be supplied from another source. Fuel gas is at all times stored in the gas tank 119.

After preheating and after the first heat step, the mass 120 is comparatively hot and the mass 121 is comparatively cool and the gas, during the first make step, is sent from right to left through the masses. In this step, the in-gas extracts sensible heat in the mass 121 until it reaches reaction temperature, probably in the central space 126. It then extracts reaction heat from the righthand end of the mass 120 and delivers sensible heat to the left-hand end of the mass 120. During the first make, the entire mass 121 is cooled and all the mass 120 except its left-hand end is cooled.

During the second make step all of the mass 120 is cooled and only the right-hand end of the mass 121 is heated. Both ends of both masses 120 and 121 are heated during the second heat step.

The above process, as illustrated in Figs. 3 and 4, is only one of several processes in which the tar separator may be used and the tar separator may be used in the above process in several ways; all, however, involving the use of the pump 33 and valve 34 between the liquid 31 in the tank 11 of the separator 101 and the central space 126 of the furnace 102. By this means tar is delivered into the center space 126 which, as long as the furnace is in normal operation, is very hot. Object (a) recited early in this specification, namely, removing tars from cracked gas, is, of course, accomplished merely by feeding these tars out of the tar extractor, but these tars present a rather troublesome disposal problem as they may amount to as much as five per cent (5%) of the total hydrocarbon delivered through the valve 114 and they are very viscous and sticky and of low commercial value. In object (b) the solution of the disposal problem is solved by feeding the tars, produced in the process in the furnace 102 back into the furnace. Object (c), the utilization of the heat units in the tar, is solved by so feeding them into the furnace that they are burned in the furnace. This, of course, can be best accomplished by feeding the tars into the central space 126 of the furnace only during a heat step. When fed into the hot central space 126, they are vaporized and then burned in the combustion air fed into the space 126 through the channels 122 in one of the masses 120 or 121. Object (d) is solved by feeding the tars into the central space 126 only during a make step.

I am not able to fully explain how the tars which have already been rejected as desired hydrocarbon material are used in forming such hydrocarbons upon being recirculated. They are, however, heavily loaded with carbon and some of this carbon apparently unites with nascent hydrogen to reform hydrocarbons.

I hereby particularly point out that I desire to obtain process claims on combinations of old and the new steps, the new steps being listed as follows:

1. The step of using a liquid maintained at a desired temperature high enough to vaporize water at the temperatures and pressures at which it is subjected for the purpose of extracting tars from a gas initially at a higher temperature than said liquid.

2. The step of injecting water into this liquid in sufficient amounts to prevent the liquid from rising above said desired temperature.

3. The step of maintaining this liquid at a desired viscosity, which is substantially lower than the viscosity of the tars at atmospheric temperature, by injecting into the liquid a solvent having a boiling point substantially higher than said desired temperature and a viscosity at atmospheric temperature much below that of said tars.

4. The step of removing undesired tars from a cracked gas and disposing of these tars by returning them to be burned in the furnace in which the cracked gas is formed by the pyrolysis of a suitable hydrocarbon.

5. The step of removing undesired tars from a cracked gas and utilizing these tars to form additional cracked gas by pyrolyzing the tars.

I also particularly point out that I desire to obtain claims to the apparatus herein described and by which certain novel results, also herein described, are claimed.

I claim as my invention:

1. A process of removing tars, which may be liquids of high viscosity at atmospheric temperature, from a cracked gas which contains a desired hydrocarbon, and which has been produced by the pyrolysis of an in-gas containing a suitable hydrocarbon, which comprises: (a) intimately contacting said gas at a temperature substantially above the vaporizing point of water at the pressure at which said contact takes place with a liquid at a desired lower temperature which is still above said vaporizing point; (b) preventing the desired temperature from rising by injecting water in controlled amount into said liquid, the amount of water so introduced being less than enough to reduce the temperature of said liquid below said desired temperature; and (c) maintaining the volume of said liquid constant by removing any excess of liquid caused by the addition of tar thereto.

2. A process of removing tars, which may be liquids of high viscosity at atmospheric temperature, from a cracked gas which contains a desired hydrocarbon, and which has been produced by the pyrolysis of an in-gas containing a suitable hydrocarbon, which comprises: (a) intimately contacting said gas at a temperature substantially above the vaporizing point of water at the pressure at which said contact takes place with a liquid at a desired lower temperature which is still above said vaporizing point; (d) diluting said liquid with a solvent having a boiling point substantially above the temperature of the cracked gas prior to its being cooled by water; (b) preventing the desired temperature from rising by injecting water in controlled amount into said liquid, the amount of water so introduced being less than enough to reduce the temperature of said liquid below said desired temperature; and (c) maintaining the volume of said liquid constant by removing any excess of liquid caused by the addition of tar thereto.

3. In a two-step heat and make cyclic process comprising: (e) a "heat" step consisting of heating a regenerative mass by passing hot products of combustion through channels in said mass, said mass being heated to a temperature at which a suitable gas, carried in an in-gas, may be pyrolyzed in a pyrolyzing zone to form a desired hydrocarbon; (f) a "make" step in which the in-gas is passed through said channels and said pyrolyzing zone and a cracked gas is formed containing a desired hydrocarbon and some undesired tar, which is a liquid of high viscosity at atmospheric temperature; the combination with the previously recited steps of additional steps as follows: (a) intimately contacting said gas at a temperature substantially above the vaporizing point of water at the pressure at which said contact takes place with a liquid at a desired lower temperature which is still above said vaporizing point; (b) preventing the desired temperature from rising by injecting water in controlled amount into said liquid, the amount of water so introduced being less than enough to reduce the temperature of said liquid below said desired temperature; and (c) maintaining the volume of said liquid constant by removing any excess of liquid caused by the addition of tar thereto.

4. In a two-step heat and make cyclic process comprising: (e) a "heat" step consisting of heating a regenerative mass by passing hot products of combustion through channels in said mass, said mass being heated to a temperature at which a suitable gas, carried in an in-gas, may be pyrolyzed in a pyrolyzing zone to form a desired hydrocarbon; (f) a "make" step in which the in-gas is passed through said channels and said pyrolyzing zone and a cracked gas is formed containing a desired hydrocarbon and some undesired tar, which is a liquid of high viscosity at atmospheric temperature; the combination with the previously recited steps of additional steps as follows: (a) intimately contacting said gas at a temperature substantially above the vaporizing point of water at the pressure at which said contact takes place with a liquid at a desired lower temperature which is still above said vaporizing point; (d) diluting said liquid with a solvent having a boiling point substantially above the temperature of the cracked gas prior to its being cooled by water; (b) preventing the desired temperature from rising by injecting water in controlled amount into said liquid, the amount of water so introduced being less than enough to reduce the temperature of said liquid below said desired temperature; and (c) maintaining the volume of said liquid constant by removing any excess of liquid caused by the addition of tar thereto.

5. A process of removing undesired liquids of high viscosity from a stream of gas which has been produced by the pyrolysis, at subatmospheric pressure and high temperature, of a suitable hydrocarbon, which process comprises: establishing a bulk supply of a liquid solvent, said supply being maintained at subatmospheric pressure; maintaining the temperature of said bulk supply a little above the boiling point of water, at the pressure maintained therein, by injecting water into said bulk supply; withdrawing a liquid stream of said solvent from said bulk supply; intimately contacting said liquid stream with said gas stream whereby said undesired liquid is collected into said liquid stream; returning said liquid stream to said bulk supply; and maintaining the volume of said bulk supply constant by withdrawing liquid therefrom as said supply is increased by the addition of undesired liquid thereto.

References Cited in the file of this patent

UNITED STATES PATENTS

| | | |
|---|---|---|
| 889,694 | Lambert | June 2, 1908 |
| 965,147 | Feld | July 19, 1910 |
| 1,578,687 | Sperr | Mar. 30, 1926 |
| 1,760,335 | Becker | May 27, 1930 |
| 1,799,084 | Brdar | Mar. 31, 1931 |
| 1,808,087 | Urguhart | June 2, 1931 |
| 1,830,178 | Sperr | Nov. 3, 1931 |
| 2,008,468 | Price | July 16, 1935 |
| 2,198,142 | Wade | Apr. 23, 1940 |
| 2,337,983 | Fisher | Dec. 28, 1943 |